(12) United States Patent
Ghazanfari (10) Patent No.: US 9,621,659 B1
(45) Date of Patent: Apr. 11, 2017

(54) SYSTEMS AND METHODS FOR PEER TO PEER COMMUNICATION

(71) Applicant: Faryar Ghazanfari, San Ramon, CA (US)

(72) Inventor: Faryar Ghazanfari, San Ramon, CA (US)

(*) Notice: Subject to any disclaimer, the term of this patent is extended or adjusted under 35 U.S.C. 154(b) by 170 days.

(21) Appl. No.: 14/287,021

(22) Filed: May 24, 2014

Related U.S. Application Data (60) Provisional application No. 61/843,908, filed on Jul. 9, 2013.

(51) Int. Cl.
*G06F 15/16* (2006.01)
*H04L 29/08* (2006.01)

(52) U.S. Cl.
CPC .................... *H04L 67/18* (2013.01)

(58) Field of Classification Search
None
See application file for complete search history.

(56) References Cited

U.S. PATENT DOCUMENTS

| | | | | |
|---|---|---|---|---|
| 2002/0122055 A1* | 9/2002 | Parupudi | ............. | G06F 17/3087 715/737 |
| 2006/0270421 A1* | 11/2006 | Phillips | ............. | G08B 21/0236 455/457 |
| 2010/0082990 A1* | 4/2010 | Grigorovitch | ........ | H04W 12/06 713/176 |
| 2010/0278345 A1* | 11/2010 | Alsina | ................. | H04L 63/0492 380/283 |
| 2012/0317297 A1* | 12/2012 | Bailey | ................... | H04W 12/06 709/229 |
| 2012/0328101 A1* | 12/2012 | Lakshminarayanan | | H04L 63/0823 380/258 |
| 2013/0169571 A1* | 7/2013 | Gai | ...................... | G06F 3/03547 345/173 |
| 2013/0231130 A1* | 9/2013 | Cherian | ................ | H04W 4/025 455/456.1 |
| 2014/0280983 A1* | 9/2014 | Paluch | .................... | H04L 67/14 709/227 |

* cited by examiner

*Primary Examiner* — Kenny Lin
(74) *Attorney, Agent, or Firm* — Faryar Ghazanfari (57) ABSTRACT

Systems and methods of establishing communication between two devices via a universal proximity pairing protocol are disclosed. In an embodiment, communication between two mobile devices are established when the mobile devices are in close proximity. The proximity is determined by measuring a critical distance which is measured by a proximity sensor on either or both of the mobile devices and the time and location when each of the mobile devices indicate the presence of another nearby object. The data are sent to a server computer that matches and pairs the mobile devices.

10 Claims, 12 Drawing Sheets

SYSTEMS AND METHODS FOR PEER TO PEER COMMUNICATION

CROSS-REFERENCE TO RELATED APPLICATIONS

This non-provisional patent application claims priority from the provisional application No. 61/843,908 filed on Jul. 9, 2013, which is incorporated herein by reference for all purposes.

BACKGROUND

There are many situations where peer to peer communication between electronic devices such as mobile phones are desired. Some mobile devices include hardware such as NFC (Near Filed Communication) circuitry that allows data transfer among mobile devices with the same capabilities. However, not many mobile devices have such capability.

Embodiments of the invention disclose systems and methods of universal peer to peer communication between mobile devices and non-mobile computers without the need for specialized hardware.

DETAILED DESCRIPTION

Embodiments of the invention disclosed herein include systems and methods for peer-to-peer communication between mobile devices such as mobile phones using proximity sensors housed in mobile devices.

Embodiments of the invention disclosed herein also include systems and methods for peer-to-peer communication between mobile devices and non-mobile devices such as mobile phones using proximity sensors housed in mobile devices and a camera and/or location detection devices housed in the non-mobile devices.

Before describing specific embodiments of the invention, some descriptions of terms are provided below.

DEFINITIONS

As used herein, an "identifier" may include computer-readable data that can include location information associated with a mobile device, a time stamp associated with the time when a proximity sensor detects a nearby object, any data and information associated with a mobile device that can be used for identification of the mobile device. Also, an identifier may be in the form of a numerical string, alpha-numerical string or alphabetical string of any length that can be used to identify a record in a database associated with a mobile device and/or a user associated with the mobile device. Such record may also include financial information and account data associated with the user of the mobile device.

As used herein, a "server computer" is typically a powerful computer or cluster of computers. For example, the server computer can be a large mainframe, a minicomputer cluster, or a group of servers functioning as a unit. In one example, the server computer may be a database server coupled to a Web server.

As used herein, a proximity sensor refers to an electronic device capable of detecting nearby objects. Such device may use a verity of protocols and methods for detecting nearby objects. For example, a proximity sensor may be an infrared sensor that emits infrared light and measures the reflectance of the emitted light, and determines based on the level of reflectance when an object is in close proximity. Other proximity devices may be inductive proximity sensors, capacitive proximity sensors, etc.

As used herein, a "computer readable medium (CRM)" refers to any suitable type of memory housed in, or externally coupled to an electronic device and capable of storing any suitable type of computer program that can be run by one or more processor. An example of a computer readable medium is a hard disc of a personal computer of laptop, or the memory of a mobile device.

Systems

Figure 1:
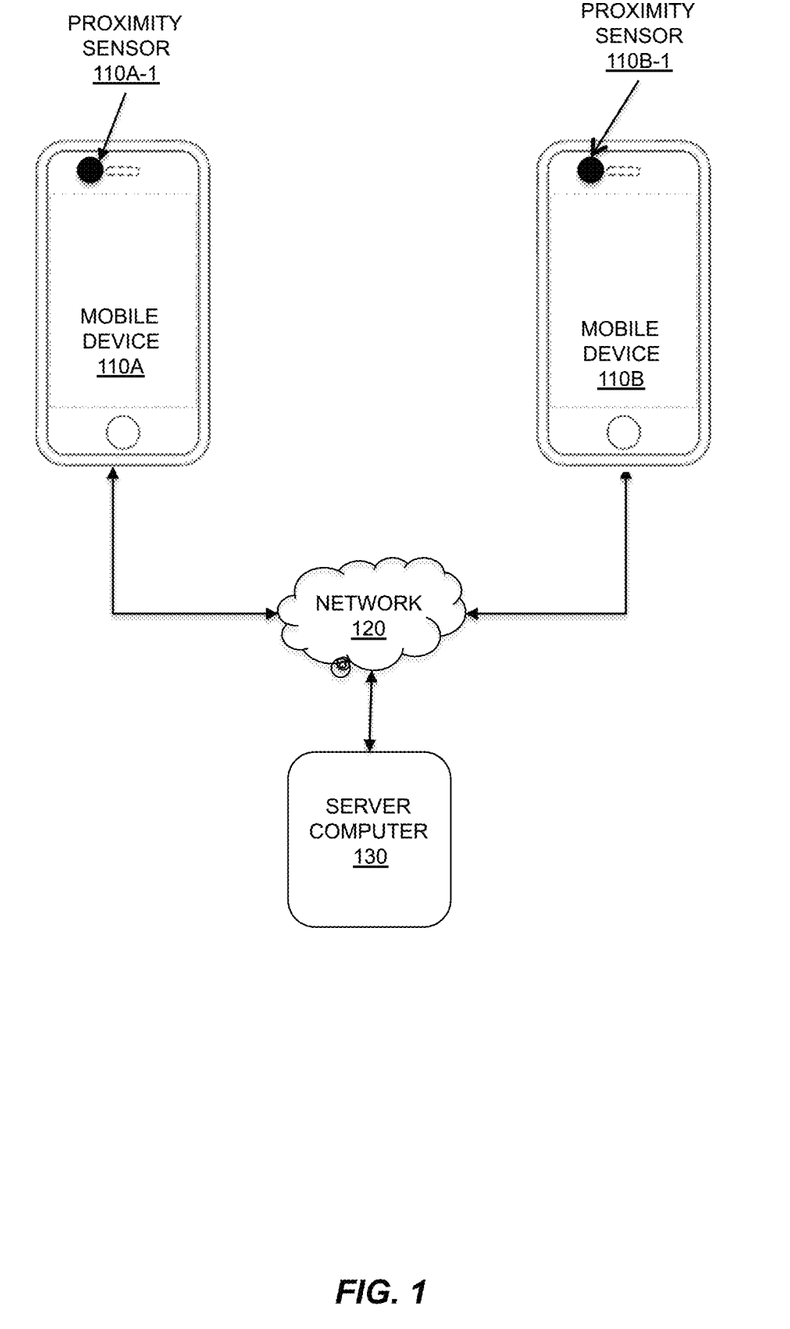
FIG. 1 shows a block diagram of a system, according to an embodiment of the invention.

FIG. 1 shows a block diagram illustrating the components of a system facilitating a peer-to-peer communication between two electronic devices according to one embodiment. FIG. 1 includes two mobile devices 110A and 110B in operative communication with server computer 130 through network 120 (e.g. the Internet). Each of the mobile devices also houses a proximity sensor. As shown in FIG. 1, mobile device 110A houses a proximity sensor 110A-1 and mobile device 110B houses a proximity sensor 110B-1.

Figure 2:
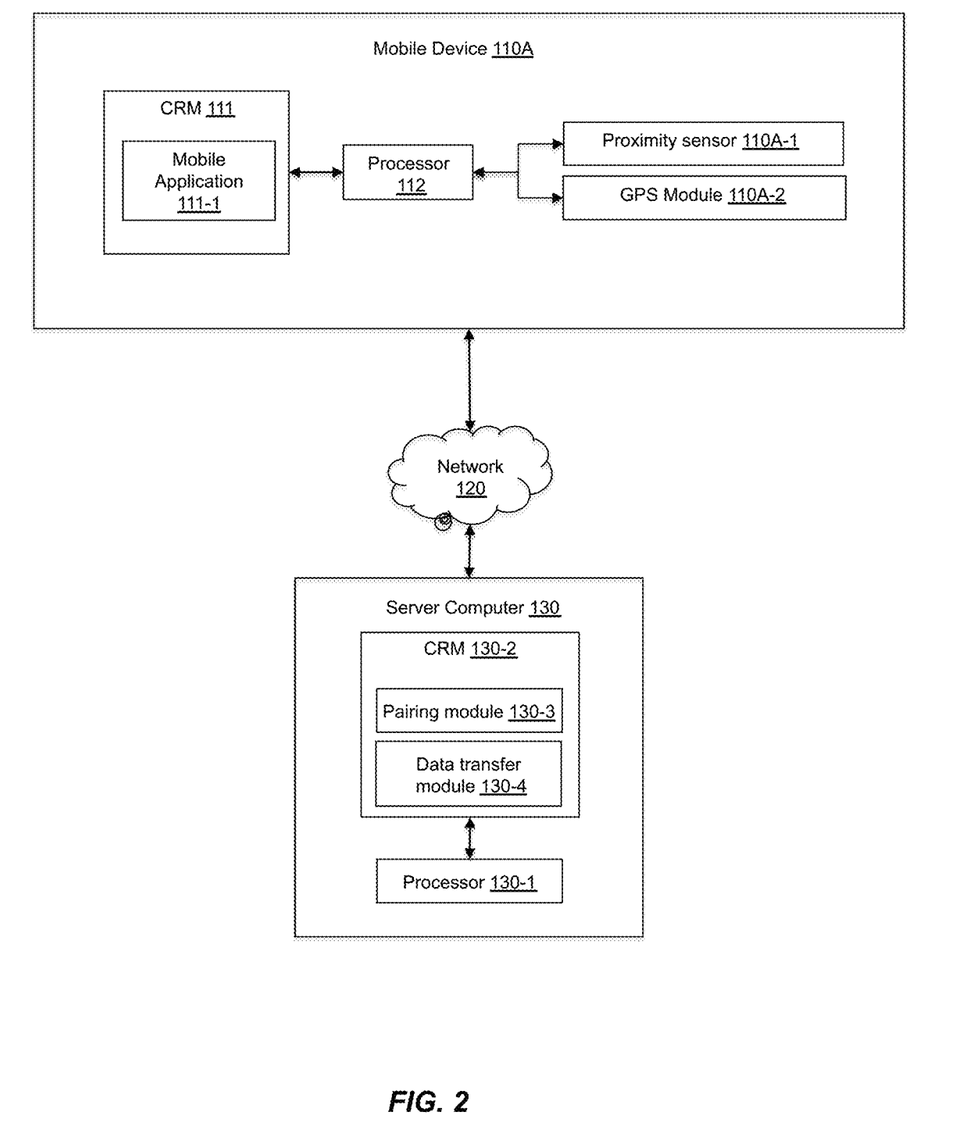
FIG. 2 shows a block diagram of a system, according to an embodiment of the invention.

FIG. 2 shows some internal elements of mobile device 110A and server computer 130. Mobile device 110A includes a computer readable medium (CRM) 111 that stores a mobile application 111-1, the CRM 111 coupled to a processor 112. A proximity sensor 110A-1 and GPS module 110A-2 are also coupled to the processor 112. The server computer 130 includes CRM 130-2 that stores a pairing module 130-3 and a data transfer module 130-4. The server computer also includes a processor 130-1 coupled to the CRM 130-2.

Mobile application 111-1 is a software application installed on a mobile device. The mobile device 110A may any mobile device (for example, any smart phone similar to iPhone or Samsung Gallaxy) and the mobile device may run on any operating system (for example, iOS, Android, and Windows). Mobile Application 111-1 may be written with various different programming languages depending on the operating system on which it runs on. Mobile application 111-1 has access to the proximity sensor 110A-1 through the development applications provided by the producer of each of the operating systems. For example, in the case of an iPhone, Apple Inc. provides access to the proximity sensor of iPhone such that it can be accessed through pre-defined classes and methods using Objective C programming language. Therefore, mobile application 111-1 can communicate with the proximity sensor and get notification when the proximity sensor detects a nearby object. Similarly, mobile application 111-1 can extract location information from the GPS module 110A-2.

Pairing module 130-3 is a software application or a portion of a software application that receives strings of data from various sources including mobile devices and determines whether the devices from which the data were sent from are in close proximity. The type of data that pairing module 130-3 receives, includes location data, time stamp associated with the time when the proximity sensor of a device detected a nearby object, identifier of the device, etc. all of which are collectively referred to as "identifier." Therefore, it will be understood by those skilled in the art that the term "identifier" refers to string of data that includes several types of information that individually or collectively allow the pairing module 130-3 determine whether the devices from which the "identifiers" have been generated are in close proximity.

Data transfer module 130-3 is a software application or a portion of a software application that receives data that needs to be communicated either to another device or to another server computer in communication with the server computer 130. Data transfer module 130-3 can transfer all types of data from one device to another device. The data transfer module 130-3 may receive the data at once and transfer the entire data load to the destination or may act as a buffer such that it receives a predetermined amount of data from an originating device, and as the data comes in, it also transfers a predetermined amount of data to the destination device until all data is delivered.

The system shown in FIGS. 1-2 is configured to facilitate pairing of two mobile devices in the context that a server computer can either perform a peer to peer communication and data transfer between them, or that the server computer recognizes that two mobile devices are in close proximity and performs an operation which on behalf of the users of the mobile devices. For example, when the server computer detects that two mobile devices are in close proximity, it may receive data from the mobile devices and perform a payment transaction such that at the conclusion of the payment processing an amount of money is transferred from a bank account of one user to the bank account of another user.

Methods

Various exemplary techniques for performing data transfer, establishing peer-to-peer connection and facilitating electronic payment transactions between two mobile devices will be described. It will be understood by those skilled in the art that the following techniques are illustrative and not restrictive.

Figure 3A:
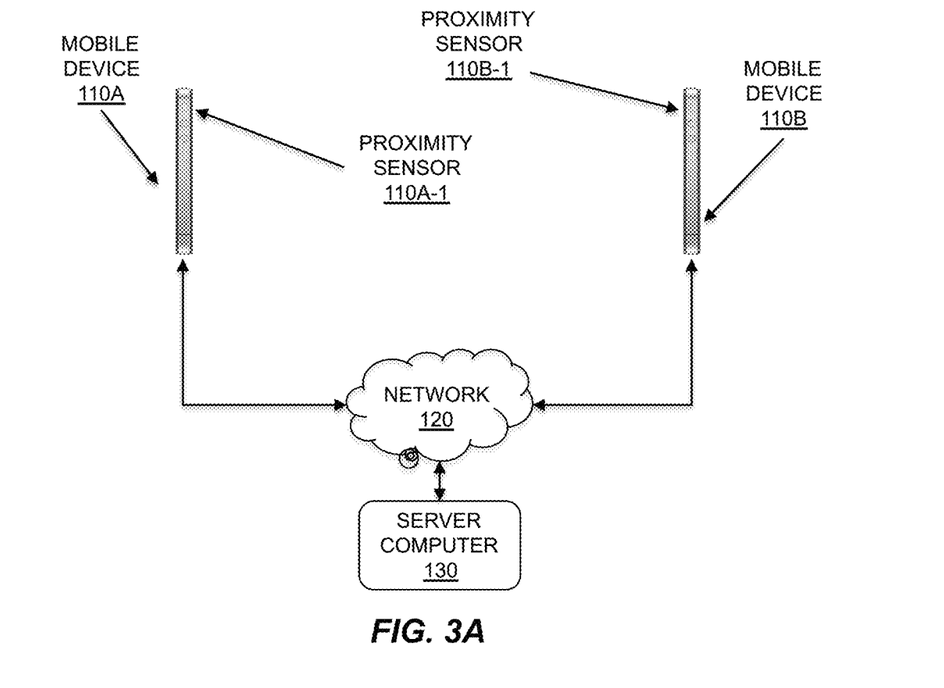
FIG. 3A shows a block diagram of a system, according to an embodiment of the invention.

FIG. 3A, illustrates mobile devices 110A and 110B from the side view. As the mobile devices come closer to each other, they reach a critical distance X (shown in FIG. 3B) where the proximity sensors of the mobile devices detect a nearby object, which happens to be the other mobile device. As described earlier, the proximity sensor may be an infrared sensor such that it produces an infrared beam and measures the reflectance of that beam. In one embodiment, at the critical distance X, the amount reflectance approaches a predetermined value, and as a result, the operating system of the mobile device is notified.

Figure 3B:
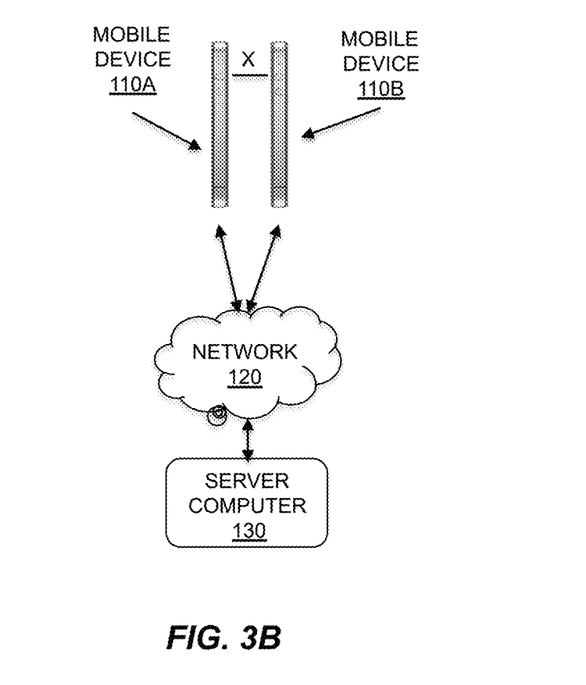
FIG. 3B shows a block diagram of a system, according to an embodiment of the invention.

The mobile application 111-1 that is installed on both mobile devices, also monitors the state of proximity sensor and when the proximity sensor is "triggered", the mobile application generates a stream of data that includes a time stamp (that may be extracted from the mobile device, and may be synched with the cellular network) which reflects the moment when the proximity sensor detected a nearby object, the current or last best known geographical location of the mobile devices, a device identifier which can be used by the server computer 130 to identify the device, in addition to other types of appropriate data (for example payment data) which depends on the particular application and the function for which the mobile application 111-1 is designed for.

The generated stream of data, which is collectively referred to as an "identifier", is then transmitted from each of the mobile device 110A and mobile device 110B to the server computer 130. When the server computer 130 receives the identifiers from the mobile devices 110A and 110B, the pairing module 130-3 then starts a process to determine whether any two identifiers indicate that (a) two mobile devices are in close proximity and (b) they intent to communicate which each other. The process performed by the pairing module 130-3 is shown in the flowchart of FIG. 4.

Figure 4:
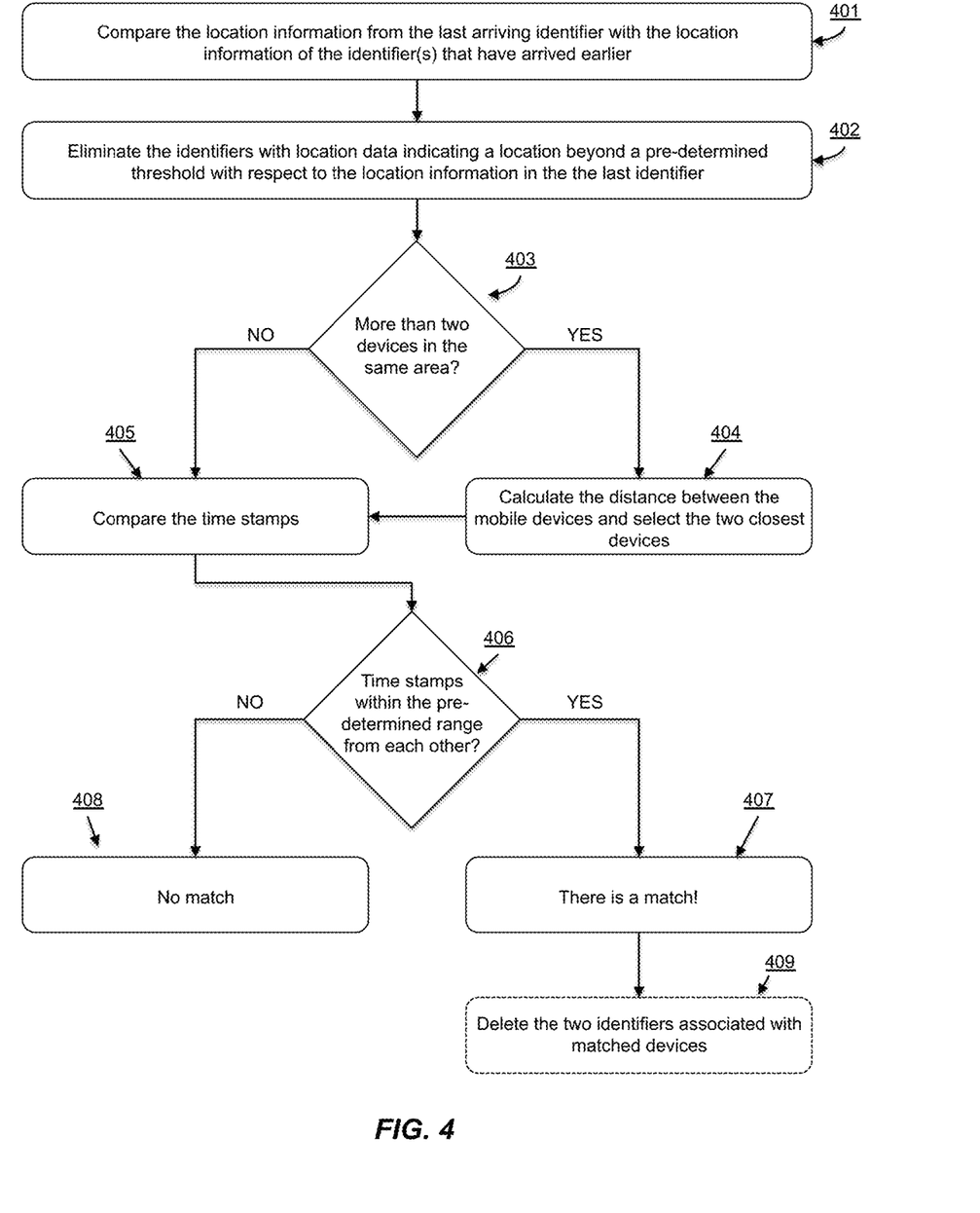
FIG. 4 shows a flowchart describing a method for determining that two devices are in close proximity at a server computer, according to an embodiment of the invention.

As shown in the flowchart of FIG. 4, this process begins by comparing the location of the last arriving identifier to the server 130 with the location information of the identifiers that have arrived earlier (step 401). This method is particularly advantageous when the server 130 processes hundreds or thousands of identifiers in a short amount of time. As each identifier is received, its location information is compared to the ones that have arrived earlier, and those locations that are beyond a pre-determined threshold are not considered (step 402). In one embodiment, the predetermined threshold may be combination of two predetermined ranges for each of devices. For example, let d1=20 feet which is set as the predetermined range for mobile device 110A and let d2=20 feet which is set as the predetermined range for mobile device 110B. Then, the predetermined threshold will be set as d1+d2=40 feet. d1 and d2 may be the equivalent to the radius of uncertainty with respect to the accuracy of the GPS. In one embodiment, at step 401, the maximum range used to search for other devices may be set to the maximum range for each device (d1+d2).

Next, the pairing module 130-3 determines whether more than two devices are determined to be in the same area (step 403). If so, the distance between the mobile devices may be calculated (step 404) and the two closest devices may be selected for additional processing. In one embodiment, the latitude and longitude information for each device may be used to calculate the distance between any two devices in the same area. After selection of two devices, the time stamps that reflect the time at which the proximity sensor detected a nearby object (which in this case is another device) are compared (step 404) to see if the time stamps are within pre-determined range from each other (step 405). In one embodiment, the predetermined range may be about 1 to 2 seconds. The reason for allowing a range may be that one proximity sensor may detect another phone sooner than the other proximity sensor. Therefore the time stamps may have a small time difference with respect to each other.

Figure 5:
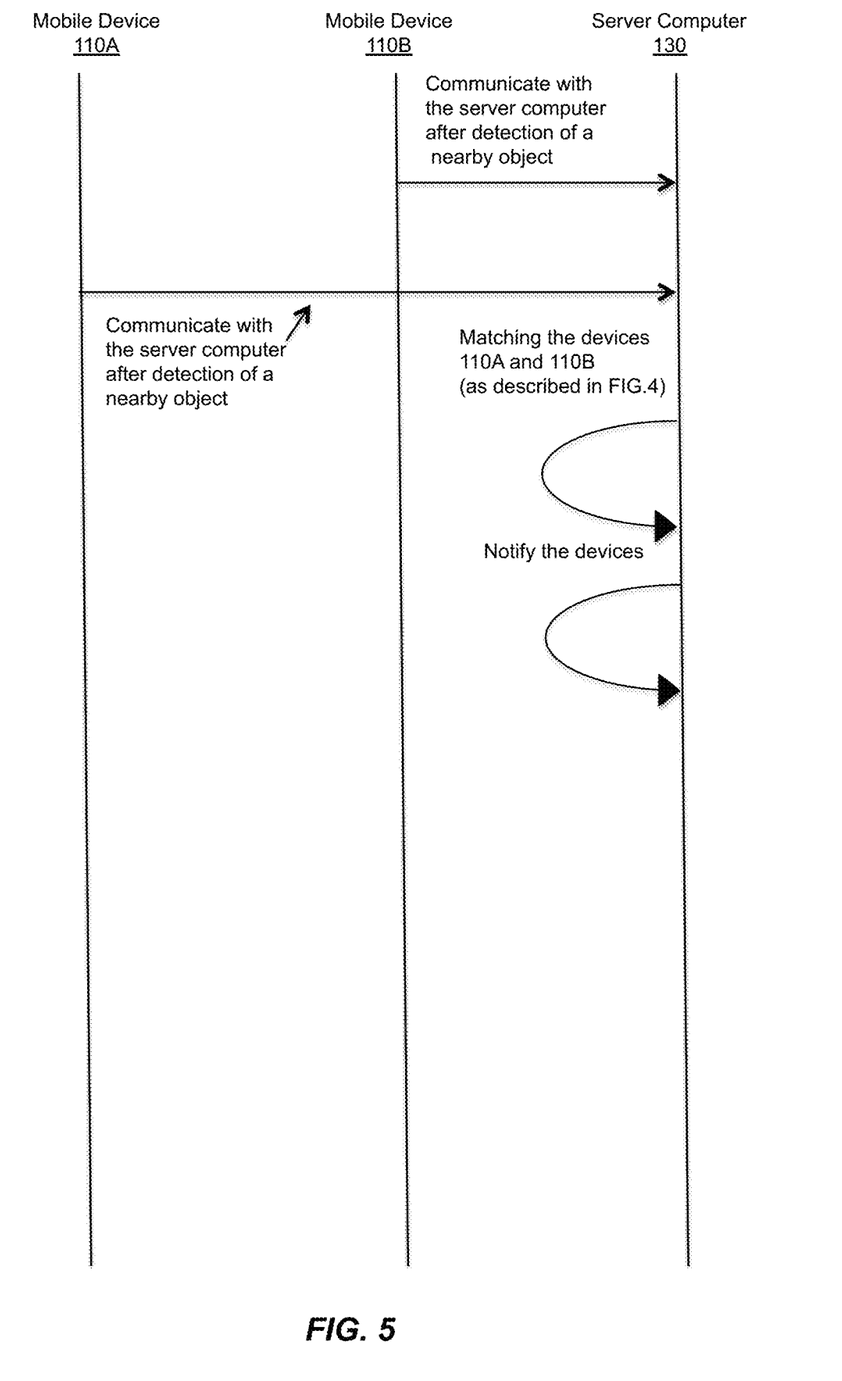
FIG. 5 illustrates the steps involved for determining that two devices are in close proximity at a server computer, according to an embodiment of the invention.

If the time stamps are within the pre-determined range, then it is determined that there is match (step 407). Otherwise there is no match (step 408). As an optional step, when a match is determined, then some portions or all of the identifiers of the two devices may be deleted or moved so that later arriving identifiers are not compared with identifiers that have already been associated with other ones. This technique is advantageous in that it provides for an efficient process. FIG. 5 illustrates the overall process involved in matching two devices based on the methods described above. In one embodiment, in addition to the time stamp that is issued by each of the devices, the server may also issue a time stamp associated with the arrival of the identifier, so that the time of arrival can also be used as a comparison factor for matching the identifiers.

Figure 6:
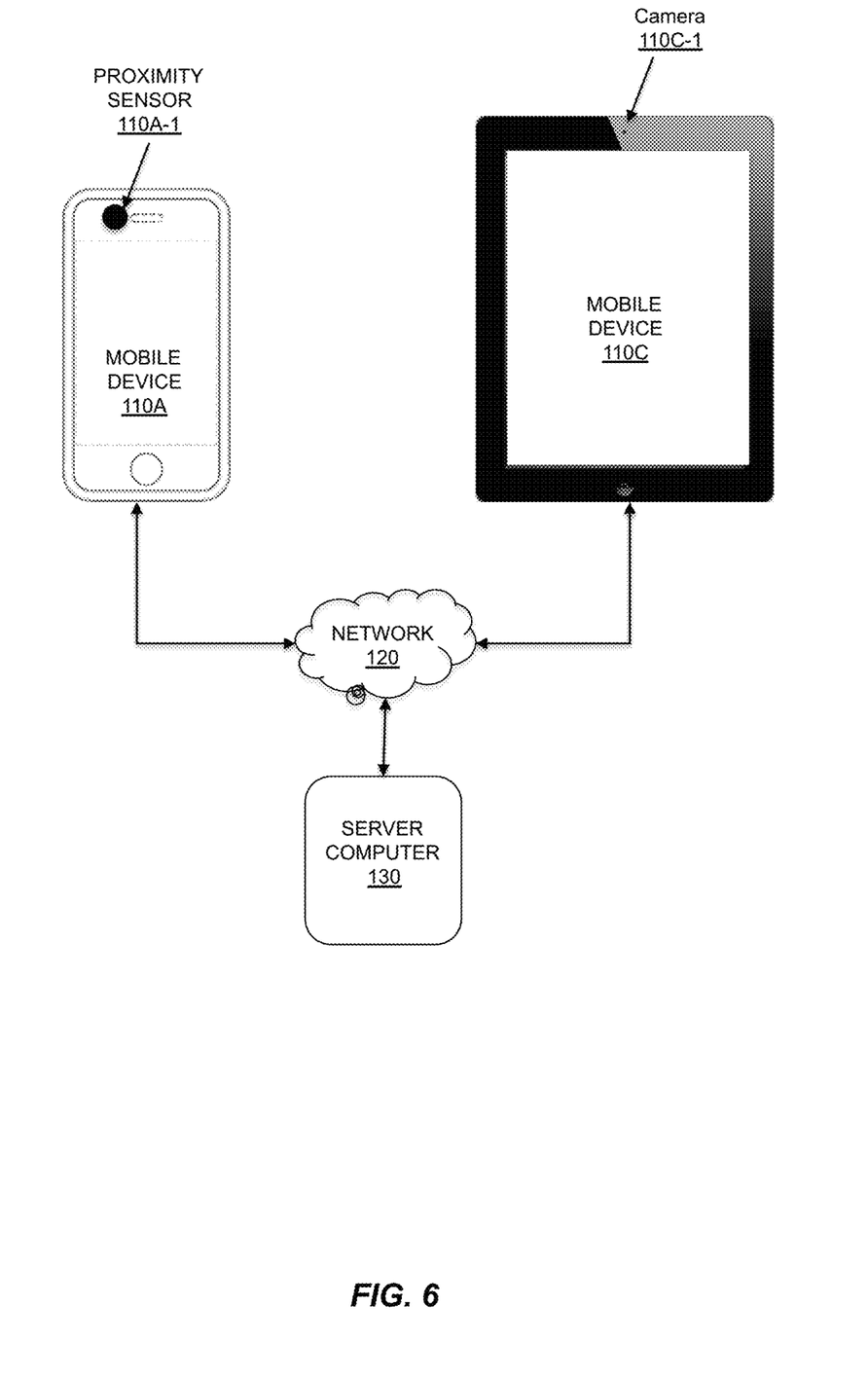
FIG. 6 shows a block diagram of a system, according to an embodiment of the invention.
Figure 7A:
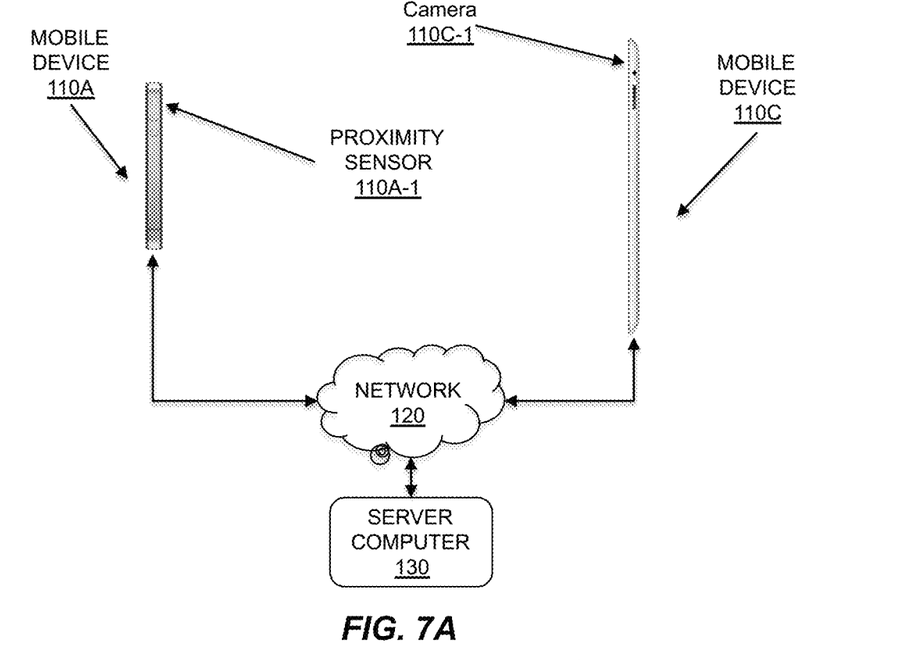
FIG. 7A shows a block diagram of a system, according to an embodiment of the invention.
Figure 7B:
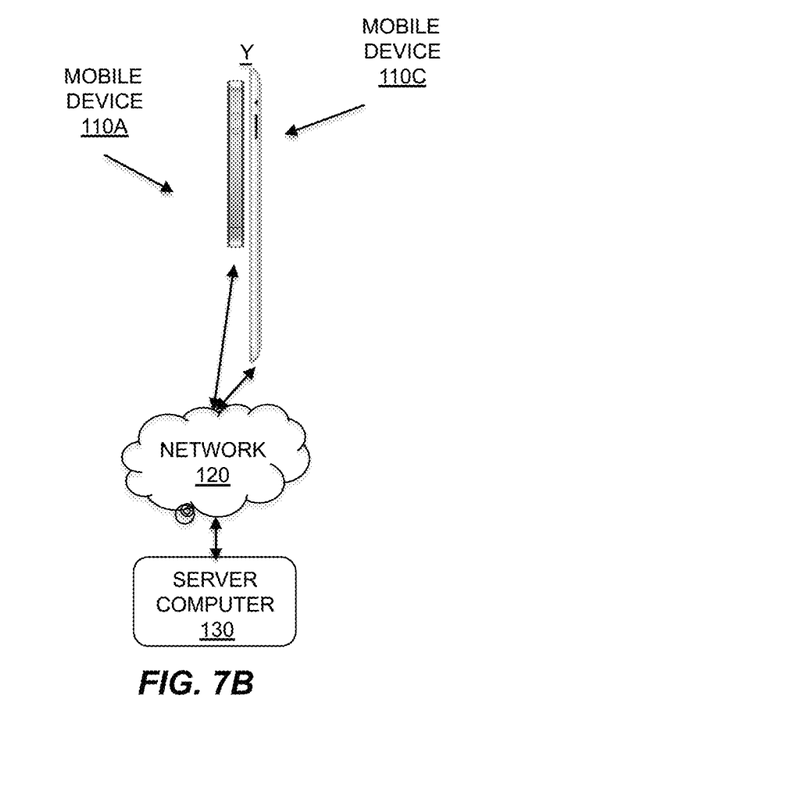
FIG. 7B shows a block diagram of a system, according to an embodiment of the invention.

FIG. 6 illustrates another embodiment where the above described system facilities the pairing of two mobile devices where one of the mobile devices does not have a proximity sensor. As shown in FIG. 6, mobile device 110C is an iPad. In this embodiment, instead of a proximity sensor, the camera 110C-1 of the mobile device 110C is used to detect a nearby object. FIGS. 7A and 7B illustrate an embodiment where a mobile device 110A which has a proximity sensor interacts with mobile device 110C (which is shows an iPad but may be any type of mobile device including tablet computers and mobile phones). As shown in FIG. 7B, mobile device 110A is placed in close proximity of mobile device 110C such that any portion of the surface area of the mobile device 110A is placed in front of and in close proximity of the camera 110C-1. The mobile application 111-1 accesses the built-in camera 110C-1 of mobile device 110C and determines when an object is within the critical distance Y of the mobile device 110C.

In one embodiment, the mobile application constantly takes pictures and analyses the pictures for changes that indicate a nearby object has restricted passage of light to the camera. In other embodiments, the mobile application may record a video and measure the light that is received by the camera 110C. The type of method used for determining presence of a nearby object in close proximity of the camera may be a determined by variety of factors. For example, in situations where mobile device 110C runs on battery power, it may be desirable to analyze pictures instead of a video file.

Figure 8:
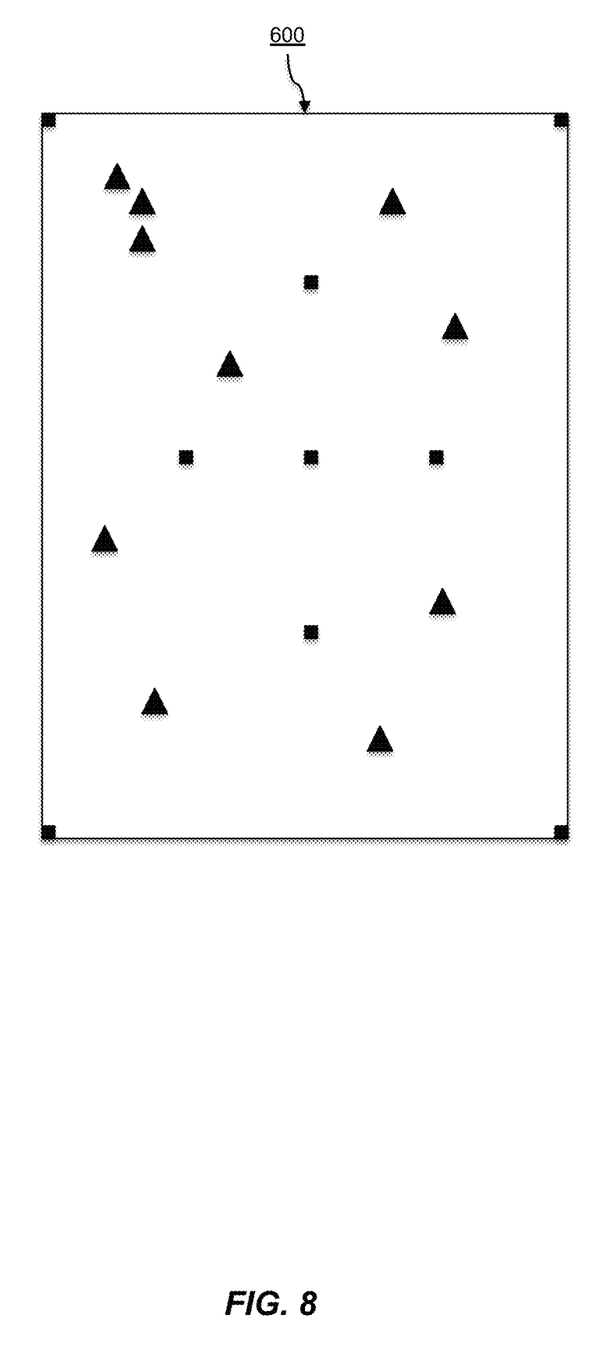
FIG. 8 shows an image and various area of image used for analysis, according to an embodiment of the invention.

FIG. 8 illustrates one exemplary technique for determining the presence of a nearby object by camera 110C-1. Area 600 represents an image taken by the camera 110C-1. As described above, as an object becomes closer to the camera 110C-1, passage of light gradually becomes more restricted until a little or no light results in an image that is dark or has mostly dark areas. The Mobile application 111-1 analyzes the image 600 and based on the amount of black or dark colored pixels, determines whether a nearby object is within the critical area Y. In one embodiment, the mobile application may designate a set of fixed positions in the image 600 and always measure the color of those fixed points. In FIG. 8, black squares represent the fixed areas in image 600 that are always checked and black triangles represent various random locations. When majority of these areas include black or dark pixels, mobile application 111-1 determines that a nearby object is within the critical distance Y. At this point, mobile application 111-1 issues a time stamp and, along with other information as described above, transmits an identifier to the server computer 130. The mobile device 110A, which has a proximity sensor 110A-1, also issues a time stamp at that time since the proximity sensor also detects a nearby object. Therefore, server computer 130 will be able to use a similar process as described above to match the two devices.

In one embodiment, the two mobile devices may both not have a proximity sensor (for example, two iPads). In this scenario analyzing an image by both of the devices as described above allows server computer 130 to match the devices. In yet another embodiment, this process can be used between a mobile device and laptop or a desktop computer having a webcam. An application running on the laptop or desktop computer performs the above process to determine when a mobile object is within the critical distance and the server computer 130 can match the devices as described above.

In one embodiment, instead of measuring the luminance of the pixels as described with respect to FIG. 8, the server computer 130 may use the location information of the mobile device 110C and pair the devices using the location information and the proximity sensor of only one device. In this embodiment, mobile device 110A and mobile device 110C both have a similar GPS coordinates which are extracted from the mobile devices and sent to the server computer 130 via the mobile application 111-1. When the mobile device 110A comes in close proximity of the mobile device 110C, the mobile device 110A notifies the server computer 130 when it reaches the critical distance. At this point, the paring module 111-1 housed by the server computer 130 matches the two devices. In this embodiment, the proximity sensor 110A-1 acts as a trigger for when the data transfer needs to happen.

The method describe in the preceding paragraph may also be used to establish communication between a mobile device and a non-mobile device such as a desktop computer. In this embodiment, the location information of the non-mobile computer is matched with the location information of the mobile device and the proximity sensor of the mobile device acts as a trigger for transfer of data. Also, this technique may be used to establish communication between mobile phones and laptop computers.

The above-described methods are technically advantageous in that communication between various mobile and non-mobile devices may be established without the need to use specialized hardware and without any consideration as to the operating system and the hardware architecture used by any one of the devices. Hence the above-described methods are a universal proximity pairing communication protocol that allows any two devices to communicate and transfer data.

A method of performing payment transaction using the above systems and methods will now be described. It will be understood that the following are exemplary embodiments demonstrating various applications that can be used with the above system. Those skilled in the art will appreciate other applications that can be implemented using the above system.

Figure 9:
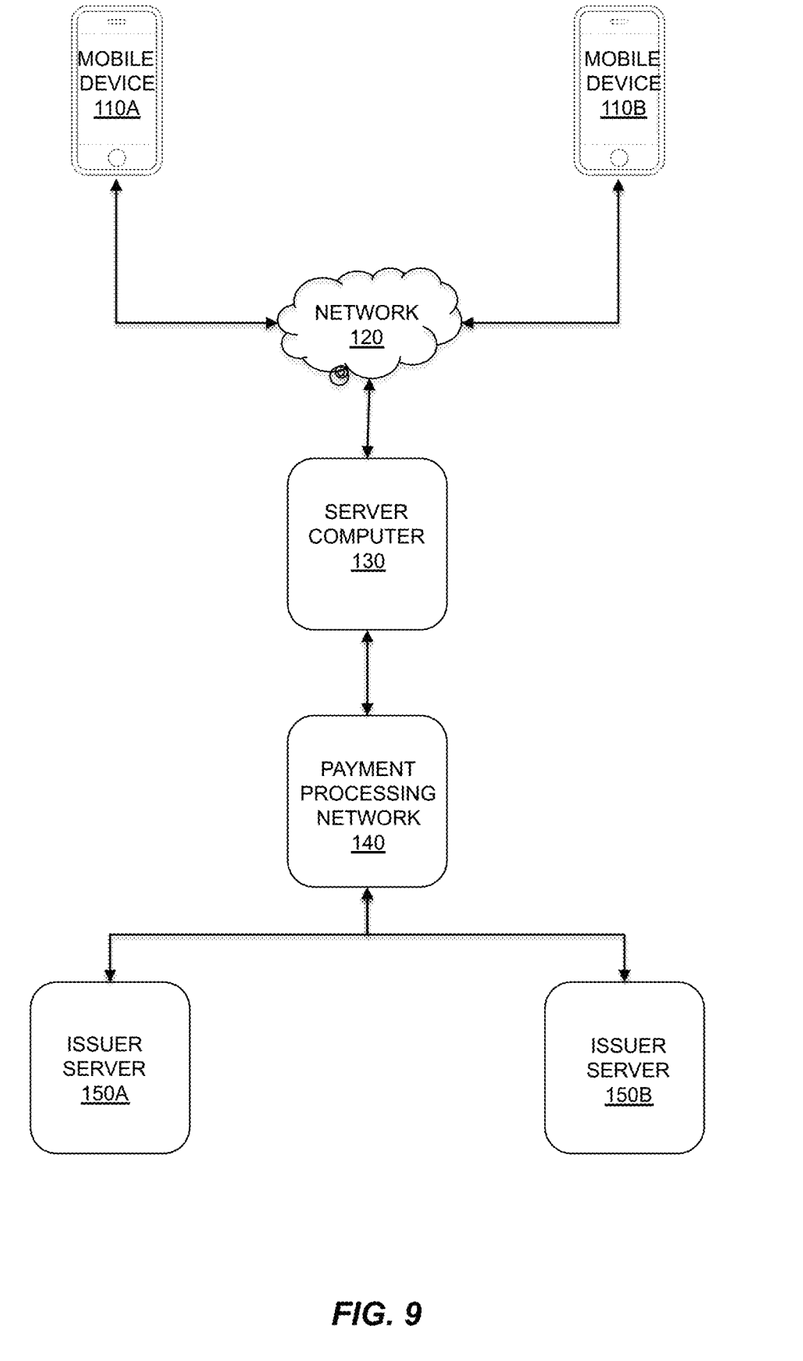
FIG. 9 shows a block diagram of a system, according to an embodiment of the invention.

FIG. 9 illustrates a peer-to-peer payment transaction between mobile devices 110A and 110B. When a user holding the mobile device 110A wants to conduct a payment transaction with mobile device 110B, the user holding the mobile device 110A loads a payment application such as mobile application 111-1. Upon loading the payment application, mobile device 110A is brought in close proximity of mobile device 110B. Mobile device 110B may need to load a similar payment application or the mobile device 110B may automatically load the appropriate mobile application. For example, if the mobile application is a native application capable of being triggered by appropriate command from a firmware that runs the proximity sensors of the device, it may load upon sensing another device in close proximity.

The user of the mobile device 110A may before or after moving the mobile device 110A in close proximity of the mobile device 110B input the amount that is going to be paid to the user of the mobile device 110B. When the mobile devices come in close proximity within the critical distance X or Y as described above, a process may be initiated to generate an authorization request message that will be transmitted to the appropriate issuer, and a payment transaction is conducted.

Figure 10:
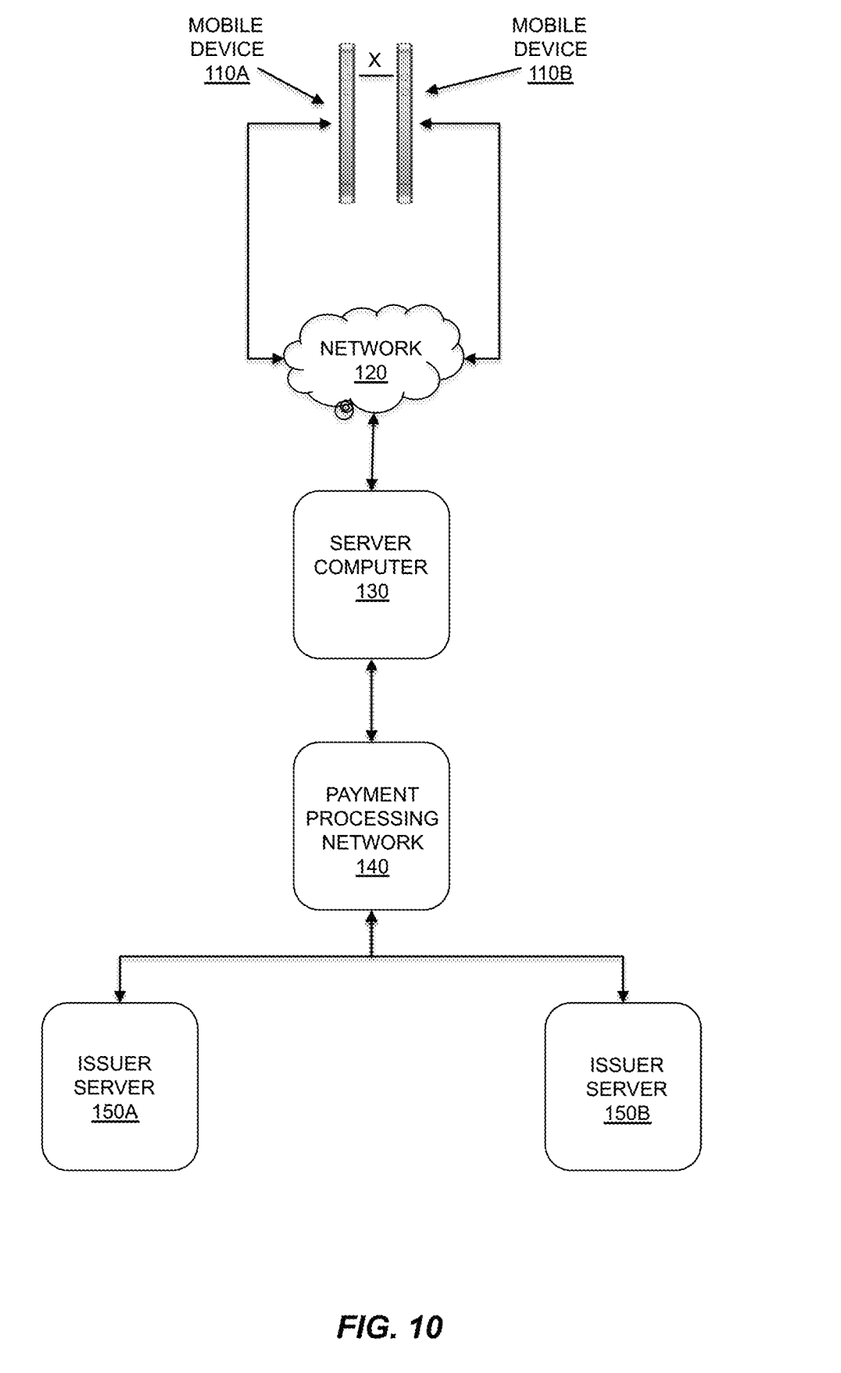
FIG. 10 shows a block diagram of a system, according to an embodiment of the invention.
Figure 11:
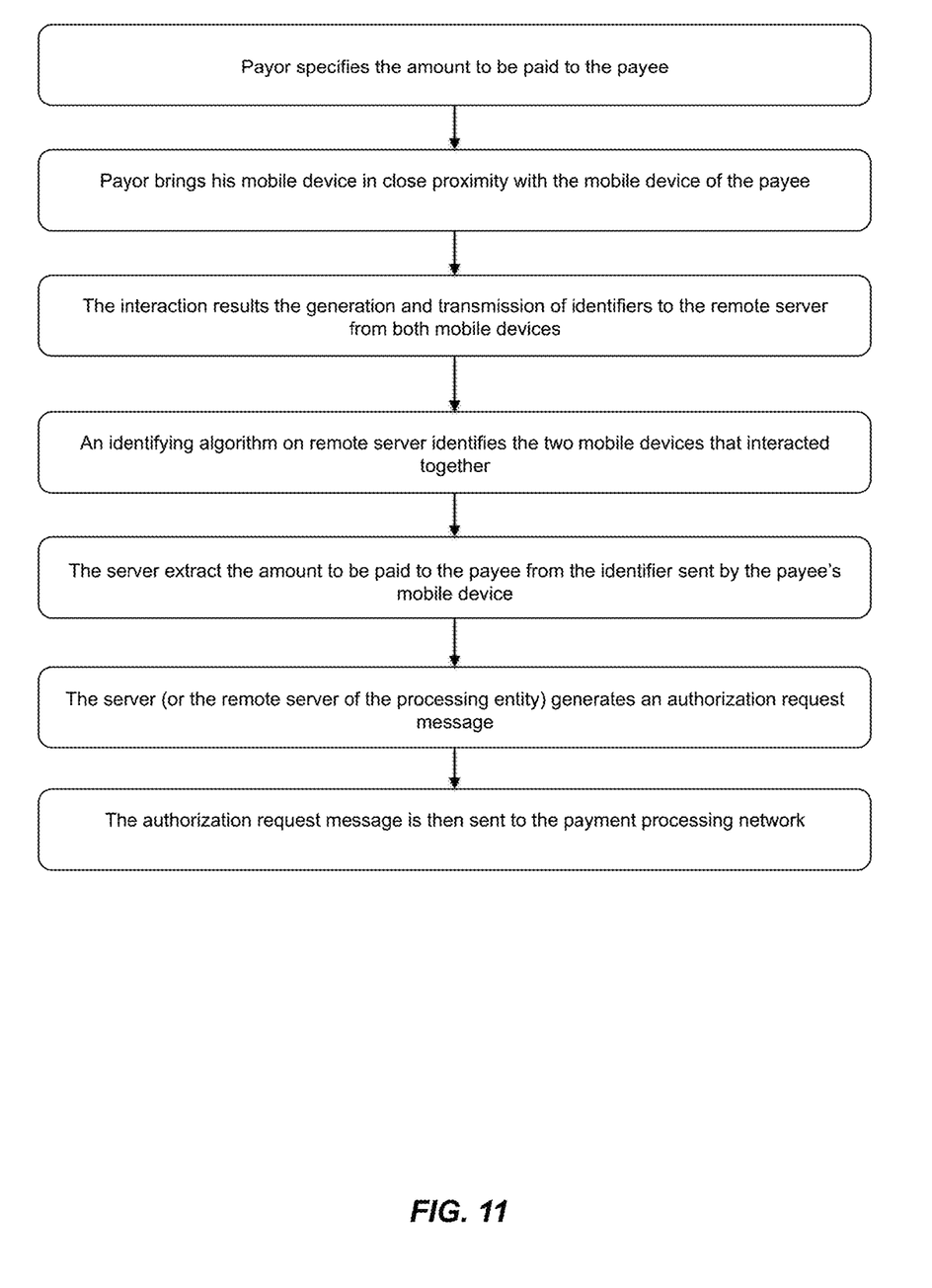
FIG. 11 illustrates the steps involved in conducting a payment transaction, according to an embodiment of the invention.
Figure 12:
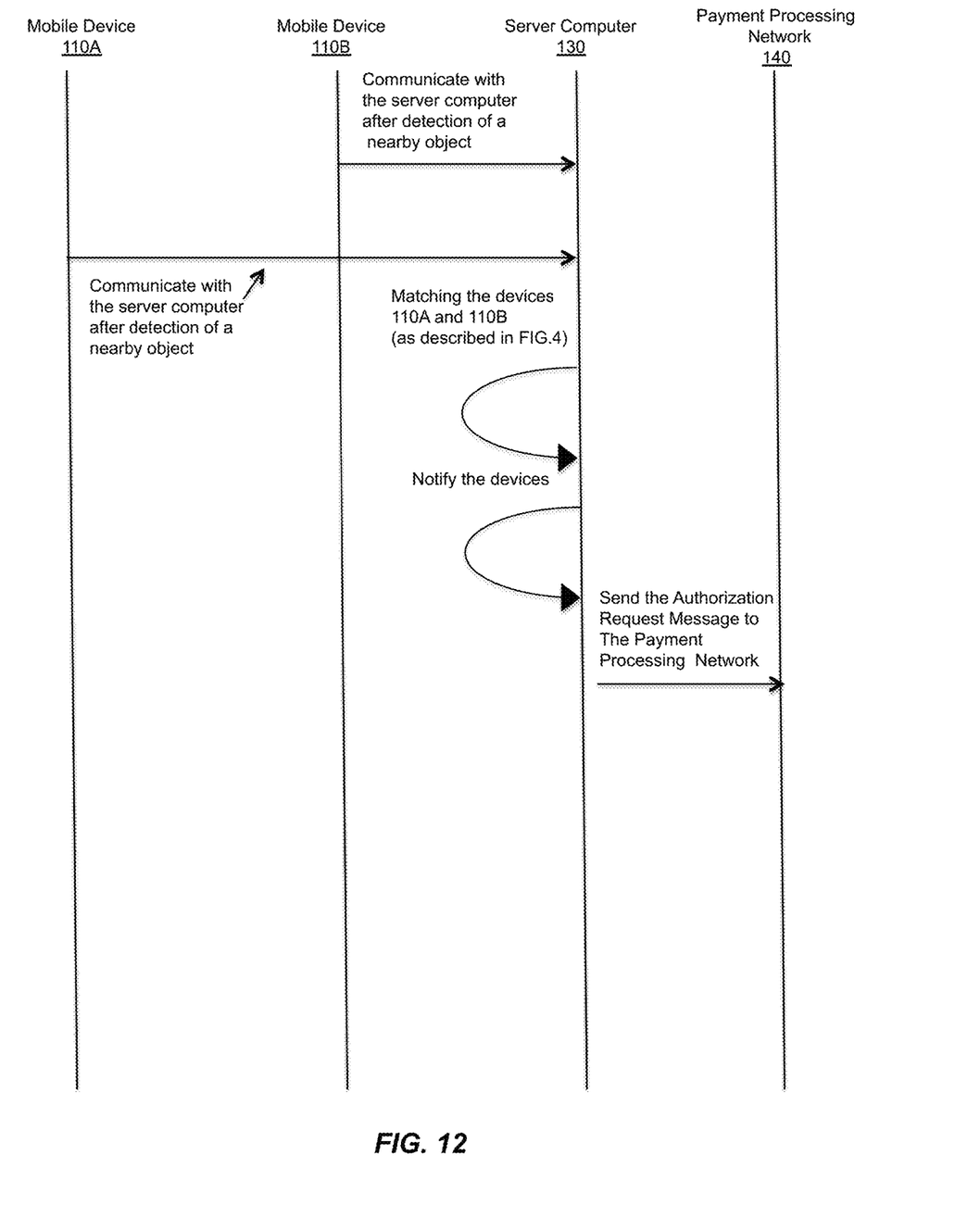
FIG. 12 shows a flowchart describing a method of conducting a payment transaction, according to an embodiment of the invention.

FIG. 10 illustrates an embodiment where the mobile devices 110A and 110B interact with each other, similar to the process described above, and each sends an identifier to the server computer 130 which pairs the mobile devices. In one embodiment, where devices are paired, the payor (the device that sends a payment to the other device) transmits data including an identifier and the amount of the transaction to the server computer 130 which initiates the process of conducting a transaction. This process is described in the flowchart of FIG. 11. FIG. 12 also illustrates the overall process of matching devices and generating an authorization request message to initiate a payment transaction.

The software components or functions described in this application may be implemented as software code to be executed by one or more processors using any suitable computer language such as, for example, Objective C, C#, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk. Any such computer-readable medium may also reside on or within a single computational apparatus, and may be present on or within different computational apparatuses within a system or network.

Embodiments of the present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. An electronic device comprising:
   a processor;
   an infrared proximity sensor coupled to the processor;
   a non-transitory computer readable medium coupled to the processor, wherein the non-transitory computer readable medium is configured to store computer readable code to perform a method, the method comprising:
   detecting an object embedded within another electronic device using the infrared proximity sensor wherein the infrared proximity sensor is configured to detect the object when it reaches a predetermined distance from the object;
   generating a first time stamp when the infrared proximity sensor detects the nearby object; and
   transmitting the time stamp to a server computer, wherein the server computer is configured to receive a second time stamp generated from the another electronic device and match the first time stamp to the second time stamp;
   transmitting electronic data to the server computer after receiving an instruction from the server computer, wherein the instruction to transmit the electronic data is issued based on comparison of the first time stamp and the second time stamp such that the first time stamp and the second time stamp are within a predetermined range, and wherein when more than two time stamps are within the predetermined range, comparison of a first location information associated with the electronic device and a second location information associated with the another electronic device is used to match the first time stamp to the second time stamp.

2. The system of claim 1, wherein the first time stamp reflecting the time when the infrared proximity sensor detected the nearby object.

3. The system of claim 1, wherein the infrared proximity sensor is housed within a mobile device.

4. The system of claim 3, wherein the mobile device is a tablet.

5. The computer implemented method for performing peer to peer communication between two devices using a server computer configured to communicate with the two devices, the method comprising:
   receiving a first time stamp from a first device having a first infrared proximity sensor;
   receiving a second time stamp from a second device having a second infrared proximity sensor;
   wherein when the first device comes in close proximity of the second device, the first infrared proximity sensor of the first device detects the presence of the second device and the second infrared proximity sensor of the second device detects the presence of the first device, and wherein when the first infrared proximity sensor detects the presence of the second device, the first time stamp is generated by the first device and wherein when the second infrared proximity sensor detects the presence of the first device, the second time stamp is generated by the second device;
   comparing the first time stamp and the second time stamp at the server computer;
   determining whether the first time stamp and the second time stamp are within a predetermined range from each other;
   comparing a first location information associated with the first device and a second location information associated with the second device when more than two time stamps are within the predetermined range; and
   establishing communication between the first device and the second device after determining that the first time stamp and the second time stamp are within the predetermined range, and when the first location information and the second location information are in close proximity if more than two time stamps are within the predetermined range.

6. The method of claim 5, wherein the first device and the second device are mobile devices.

7. The method of claim 5, wherein the first location information associated with the first device is the GPS location of the first device.

8. The method of claim 5, wherein the first infrared proximity sensor or the second infrared proximity sensor detects a nearby object in close proximity without the need for the nearby object to physically contact the first or the second infrared proximity sensor or a housing in which the first or the second infrared proximity sensor in housed in.

9. A computer implemented method for performing peer to peer communication between two devices using a server computer configured to communicate with the two devices, the method comprising:

receiving a plurality of identifiers from a plurality of devices, wherein each of the plurality of identifiers include location information associated with a corresponding device of the plurality of devices from which one of the plurality of identifiers was generated as a result of detection of a nearby object by an infrared proximity sensor housed in the corresponding device, and wherein each of the plurality of identifiers include a time stamp associated with the time when the infrared proximity sensor detected the nearby object;

comparing the time stamps associated with at least two of the plurality of devices;

selecting two devices having the time stamps within a pre-determined range from each other;

if more than two device have the time stamps within the pre-determined range, comparing the location information from the plurality of identifiers;

determining whether the location information from the plurality of identifiers indicates that the selected two devices are within a predetermined radius with respect to each other; and establishing communication between the selected two devices when the selected two devices are within a predetermined radius.

10. The method of claim 9, wherein the devices are mobile devices.

* * * * *